United States Patent [19]

Bratsberg

[11] 4,159,845
[45] Jul. 3, 1979

[54] AIRSTREAM DEFLECTOR FOR MOTOR VEHICLES

[76] Inventor: Glenn N. Bratsberg, P.O. Box 723, Lewiston, Id. 83501

[21] Appl. No.: 889,007

[22] Filed: Mar. 22, 1978

[51] Int. Cl.² .............................................. B60J 1/20
[52] U.S. Cl. .................. 296/95 R; 296/1 S; 296/91
[58] Field of Search ............... 296/91, 95 R, 95 Q, 296/96, 1 S

[56] References Cited
U.S. PATENT DOCUMENTS 3,015,517  1/1962  Thornburg .............................. 296/91
3,419,897  12/1968  Bratsberg .............................. 296/1 S
3,524,672  8/1970  Rawlings .............................. 296/1 S Primary Examiner—Richard A. Bertsch

[57] ABSTRACT

An accessory mountable along a front of an automotive vehicle, so as to deflect air upwardly, and forming a curtain of air forwardly of the windshield, so that dust, bugs, rain or snow is lifted over the top of the vehicle, instead of being deposited upon the windshield; the accessory including a laterally extending inclined baffle, for thrusting the air upwardly, and also including a louver thereabove, which is pivoted by the force of air, in order to open a throat, and thrust the air at a desired angle and at a desired volume.

1 Claim, 8 Drawing Figures

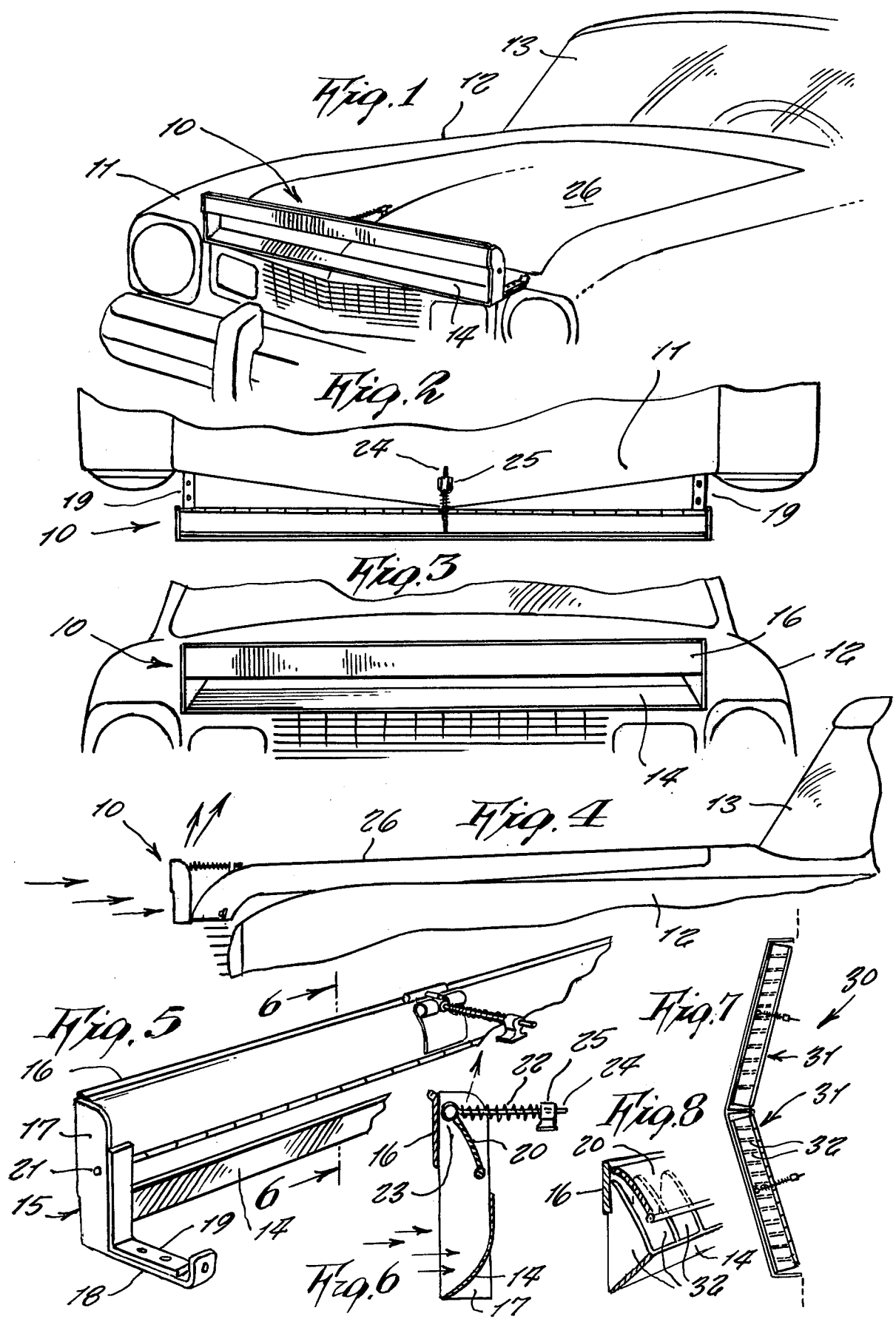

AIRSTREAM DEFLECTOR FOR MOTOR VEHICLES

This invention relates generally to automotive accessories.

A principal object of the present invention is to provide an airstream deflector, mountable at a front of a vehicle, so that, as the vehicle travels forwardly, a volume of air is deflected upwardly before the windshield, in the manner of a curtain, in order that dust, bugs, rain or snow flakes are carried over the top of the vehicle, instead of being deposited upon the windshield.

Another object is to provide an airstream deflector, which includes an upwardly inclined baffle for thrusting air upwardly, and which also includes an air flow actuator, that is automatically adjustable according to the speed of the vehicle, so as to open up a throat, through which the upwardly moving air is passed, the air flow actuator allowing a greater volume of air through the throat when the vehicle is travelling at a higher speed, in order to obtain maximum efficiency in forming a curtain of upwardly travelling air.

Other objects are to provide an airstream deflector, which is simple in design, inexpensive to manufacture, rugged in construction, easy to use and efficient in operation.

These, and other objects, will be readily evident, upon a study of the following specification, and the accompanying drawings, wherein:

FIG. 1 is a perspective view of the present invention, installed upon an automotive vehicle;

FIG. 2 is a top view thereof;

FIG. 3 is a front view thereof;

FIG. 4 is a side view thereof;

FIG. 5 is a fragmentary rear perspective view, showing one end of the airstream deflector;

FIG. 6 is an enlarged cross-sectional view, taken on line 6—6 of FIG. 5;

FIG. 7 is a top view of a modified design of the invention, and which conforms to a contour of a car front, that may be forwardly appointed or otherwise shaped, and FIG. 8 is an enlarged fragmentary perspective view of the device shown in FIG. 7, and as seen from a direction similar to that of FIG. 5.

Referring now to the drawing in greater detail, and more particularly to FIGS. 1 through 6 thereof at this time, the reference numeral 10 represents an airstream deflector, according to the present invention, wherein the same is installed across a front end 11 of an automotive vehicle 12, so that it serves to deflect air borne particles, such as dust, bugs, rain, or snow, upwardly in order to not land upon the vehicle windshield 13.

The airstream deflector may be made from aluminum components, or they may be made of any other suitable material. The device includes a long, transverse extending baffle 14, which, at its opposte ends, is secured to a frame 15, that includes transverse extending, long, vertical plate 16, which, at its opposite end, is integral with vertical side plates 17, to which the ends of the baffle 14 are secured. A rearward extending tongue 18, at a lower end of side plate 17, and an angle bracket 19 thereupon, provide means for securing the opposite ends of the airstream deflector to the automotive vehicle.

A transverse extending louver 20 is pivotable about a pin 21, supported at opposite ends within each of the side plates 17, the louver being located in spaced relation behind the vertical transverse plate 16. A compression coil spring 22 urges the upper edge of the louver toward a rear side of the vertical, transverse plate 16, in order to form a constricting throat 23 between the plate and louver.

The spring 22 is coiled around a pin 24, which at one end is carried a slidably adjustable collar 25, against which the end of the spring 22 abuts, so as to be adjustable in tension, while an opposte end of the spring bears against a housing attached to the louver 20, and through which the pin extends to the plate 16.

In operative use, the coil spring, together with the louver, form an airflow actuator, for controlling the volume of air that moves through the throat 23. In operation, as the vehicle travels ahead, the air in front of the vehicle strikes against the baffle 14, which thus deflects the air upwardly into the throat 23. The pressure of air within this throat depends upon the speed of the vehicle, so that the greater the speed thereof, the larger the air volume pressure in the throat, so as to cause the louver to pivot against the action of the spring 22, and thus open the throat, and allow the deflected air to be upwardly moved in the form of a curtain in front of the vehicle, and spaced from the windshield. This curtain of air cuts across falling rain or snow, and other particles, which otherwise would land upon the vehicle windshield, as the vehicle travels ahead. Such particles, accordingly, are thrust upwardly higher than the windshield, so that they are deposited in the layer of air which moves across the top of the vehicle. Thus, the airstream deflector forms a protective canopy for the hood portion as well as the windshield.

In FIGS. 7 and 8, a modified design of airstream deflector 30 is generally a same as above described airstream deflector 10, and incorporates components that are generally similar. However, the airstream deflector 30 is shaped to conform to the contour of a car front, that may be pointed or otherwise shaped. FIG. 7 illustrates it for a forwardly pointed vehicle front end. The airstream deflector 30, accordingly, includes two straight sections 31, which are angularly inclined respective to each other, each section being made of components as above described. In order that the rearward incline of the baffles and louvers do not split the upwardly deflected air curtain at its center, this form of the invention additionally includes a plurality of parallel, spaced-apart vertical baffles 32, which thus maintain a continuous air curtain across the front of the vehicle.

While various changes may be made in the detail construction, it is understood that such changes will be within the spirit and scope of the present invention, as is defined by the appended claims.

What I now claim is:

1. An airstream deflector, comprising, in combination, a transverse extending baffle, secured in a frame, supported at a front of an automotive vehicle, said baffle deflecting air upwardly as said vehicle travels forward; and said deflector additionally including a transverse extending vertical plate in front of a rearwardly pivotable louver, forming a throat therebetween; an airflow actuator automatically pivoting said louver rearwardly by air pressure within said throat, said actuator including a compression coil spring between said louver and a stationary positioned, collar-like member; and said airstream deflector being made in right and left-side sections, which at their outer ends are rearwardly inclined, said sections including a plurality of parallel, spaced-apart, vertical baffles extending between said transverse baffle and into said throat, said parallel baffles being all parallel to a forward-rearward direction of said vehicle.

* * * * *